US011935478B2

(12) United States Patent
Soni et al.

(10) Patent No.: US 11,935,478 B2
(45) **Date of Patent: *Mar. 19, 2024**

(54) AMOLED DISPLAYS WITH MULTIPLE READOUT CIRCUITS

(71) Applicant: IGNIS INNOVATION INC., Waterloo (CA)

(72) Inventors: Jaimal Soni, Waterloo (CA); Ricky Yik Hei Ngan, Richmond Hills (CA); Gholamreza Chaji, Waterloo (CA); Nino Zahirovic, Waterloo (CA); Joseph Marcel Dionne, Waterloo (CA)

(73) Assignee: Ignis Innovation Inc., Road Town (VG)

(*) Notice: Subject to any disclaimer, the term of this patent is extended or adjusted under 35 U.S.C. 154(b) by 0 days.

This patent is subject to a terminal disclaimer.

(21) Appl. No.: 18/184,090

(22) Filed: Mar. 15, 2023

(65) Prior Publication Data

US 2023/0215370 A1 Jul. 6, 2023

Related U.S. Application Data

(63) Continuation of application No. 17/354,233, filed on Jun. 22, 2021, now Pat. No. 11,631,371, which is a (Continued)

(51) Int. Cl.

| | |
|---|---|
| ***G09G 5/10*** | (2006.01) |
| ***G09G 3/3233*** | (2016.01) |
| ***G09G 3/325*** | (2016.01) |
| ***G09G 3/3258*** | (2016.01) |
| ***G09G 3/3291*** | (2016.01) |

(52) U.S. Cl.
CPC ........... *G09G 3/3233* (2013.01); *G09G 3/325* (2013.01); *G09G 3/3258* (2013.01); *G09G 3/3291* (2013.01); *G09G 2300/0809* (2013.01); *G09G 2320/0233* (2013.01); *G09G 2320/0295* (2013.01); *G09G 2320/043* (2013.01); *G09G 2320/045* (2013.01)

(58) Field of Classification Search
CPC ................. G09G 3/3233; G09G 3/325; G09G 3/3258; G09G 3/3291; G09G 2300/0809; G09G 2320/0233; G09G 2320/0295; G09G 2320/043; G09G 2320/045
USPC ......................................... 345/690, 693, 698
See application file for complete search history.

(56) References Cited

U.S. PATENT DOCUMENTS

2006/0092183 A1 5/2006 Malmberg
2008/0203930 A1 8/2008 Budzelaar et al.
(Continued)

*Primary Examiner* — Thuy N Pardo
(74) *Attorney, Agent, or Firm* — Stratford Group Ltd.

(57) ABSTRACT

The OLED voltage of a selected pixel is extracted from the pixel produced when the pixel is programmed so that the pixel current is a function of the OLED voltage. One method for extracting the OLED voltage is to first program the pixel in a way that the current is not a function of OLED voltage, and then in a way that the current is a function of OLED voltage. During the latter stage, the programming voltage is changed so that the pixel current is the same as the pixel current when the pixel was programmed in a way that the current was not a function of OLED voltage. The difference in the two programming voltages is then used to extract the OLED voltage.

20 Claims, 6 Drawing Sheets

Related U.S. Application Data continuation of application No. 16/574,191, filed on Sep. 18, 2019, now Pat. No. 11,074,859, which is a continuation of application No. 15/978,871, filed on May 14, 2018, now Pat. No. 10,460,660, which is a continuation of application No. 15/630,142, filed on Jun. 22, 2017, now Pat. No. 9,997,107, which is a continuation of application No. 15/077,399, filed on Mar. 22, 2016, now Pat. No. 9,721,512, which is a continuation of application No. 14/204,209, filed on Mar. 11, 2014, now Pat. No. 9,324,268.

(60) Provisional application No. 61/787,397, filed on Mar. 15, 2013.

(56) References Cited

U.S. PATENT DOCUMENTS

| | | | | |
|---|---|---|---|---|
| 2010/0134475 | A1* | 6/2010 | Ogura | G09G 3/3291 345/213 |
| 2012/0293478 | A1 | 11/2012 | Chaji | |
| 2022/0223094 | A1 | 7/2022 | Nathan et al. | |

* cited by examiner

AMOLED DISPLAYS WITH MULTIPLE READOUT CIRCUITS

CROSS-REFERENCE TO RELATED APPLICATIONS

This application is a continuation of U.S. patent application Ser. No. 17/354,233, filed Jun. 22, 2021, now allowed, which is a continuation of U.S. patent application Ser. No. 16/574,191, filed Sep. 18, 2019, now allowed, which is a continuation of U.S. patent application Ser. No. 15/978,871, filed May 14, 2018, now U.S. Pat. No. 10,460,660, which is a continuation of U.S. patent application Ser. No. 15/630,142, filed Jun. 22, 2017, now U.S. Pat. No. 9,997,107, which is a continuation of U.S. patent application Ser. No. 15/077,399, filed Mar. 22, 2016, now U.S. Pat. No. 9,721,512, which is a continuation of U.S. patent application Ser. No. 14/204,209, filed Mar. 11, 2014, now U.S. Pat. No. 9,324,268, which claims the benefit of U.S. Provisional Application No. 61/787,397, filed Mar. 15, 2013 all of which are is-hereby incorporated by reference herein in their entirety.

FIELD OF THE INVENTION

The present disclosure generally relates to circuits for use in displays, particularly displays such as active matrix organic light emitting diode displays having multiple readout circuits for monitoring the values of selected parameters of the individual pixels in the displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Some schemes for providing compensation to displays to account for variations across the display panel and over time utilize monitoring systems to measure time dependent parameters associated with the aging (i.e., degradation) of the pixel circuits. The measured information can then be used to inform subsequent programming of the pixel circuits so as to ensure that any measured degradation is accounted for by adjustments made to the programming. Such monitored pixel circuits may require the use of additional transistors and/or lines to selectively couple the pixel circuits to the monitoring systems and provide for reading out information. The incorporation of additional transistors and/or lines may undesirably decrease pixel-pitch (i.e., "pixel density").

SUMMARY

In accordance with one embodiment, the OLED voltage of a selected pixel is extracted from the pixel produced when the pixel is programmed so that the pixel current is a function of the OLED voltage. One method for extracting the OLED voltage is to first program the pixel in a way that the current is not a function of OLED voltage, and then in a way that the current is a function of OLED voltage. During the latter stage, the programming voltage is changed so that the pixel current is the same as the pixel current when the pixel was programmed in a way that the current was not a function of OLED voltage. The difference in the two programming voltages is then used to extract the OLED voltage.

Another method for extracting the OLED voltage is to measure the difference between the current of the pixel when it is programmed with a fixed voltage in both methods (being affected by OLED voltage and not being affected by OLED voltage). This measured difference and the current-voltage characteristics of the pixel are then used to extract the OLED voltage.

A further method for extracting the shift in the OLED voltage is to program the pixel for a given current at time zero (before usage) in a way that the pixel current is a function of OLED voltage, and save the programming voltage. To extract the OLED voltage shift after some usage time, the pixel is programmed for the given current as was done at time zero. To get the same current as time zero, the programming voltage needs to change. The difference in the two programming voltages is then used to extract the shift in the OLED voltage. Here one needs to remove the effect of TFT aging from the second programming voltage first; this is done by programming the pixel without OLED effect for a given current at time zero and after usage. The difference in the programming voltages in this case is the TFT aging, which is subtracted from the calculated difference in the aforementioned case.

In one implementation, the current effective voltage $V_{OLED}$ of a light-emitting device in a selected pixel is determined by supplying a programming voltage to the drive transistor in the selected pixel to supply a first current to the light-emitting device (the first current being independent of the effective voltage $V_{OLED}$ of the light-emitting device); measuring the first current; supplying a second programming voltage to the drive transistor in the selected pixel to supply a second current to the light-emitting device, the second current being a function of the current effective voltage $V_{OLED}$ of the light-emitting device; measuring the second current and comparing the first and second current measurements; adjusting the second programming voltage to make the second current substantially the same as the first current; and extracting the value of the current effective voltage $V_{OLED}$ of the light-emitting device from the difference between the first and second programming voltages.

In another implementation, the current effective voltage $V_{OLED}$ of a light-emitting device in a selected pixel is determined by supplying a first programming voltage to the drive transistor in the selected pixel to supply a first current to the light-emitting device in the selected pixel (the first current being independent of the effective voltage $V_{OLED}$ of the light-emitting device), measuring the first current, supplying a second programming voltage to the drive transistor in the selected pixel to supply a second current to the light-emitting device in the selected pixel (the second current being a function of the current effective voltage $V_{OLED}$ of the light-emitting device), measuring the second current, and extracting the value of the current effective voltage $V_{OLED}$ of the light-emitting device from the difference between the first and second current measurements.

In a modified implementation, the current effective voltage $V_{OLED}$ of a light-emitting device in a selected pixel is determined by supplying a first programming voltage to the drive transistor in the selected pixel to supply a predetermined current to the light-emitting device at a first time (the first current being a function of the effective voltage $V_{OLED}$ of the light-emitting device), supplying a second programming voltage to the drive transistor in the selected pixel to supply the predetermined current to the light-emitting device at a second time following substantial usage of the display, and extracting the value of the current effective voltage $V_{OLED}$ of the light-emitting device from the difference between the first and second programming voltages.

In another modified implementation, the current effective voltage $V_{OLED}$ of a light-emitting device in a selected pixel is determined by supplying a predetermined programming voltage to the drive transistor in the selected pixel to supply a first current to the light-emitting device (the first current being independent of the effective voltage $V_{OLED}$ of the light-emitting device), measuring the first current, supplying the predetermined programming voltage to the drive transistor in the selected pixel to supply a second current to the light-emitting device (the second current being a function of the current effective voltage $V_{OLED}$ of the light-emitting device), measuring the second current, and extracting the value of the current effective voltage $V_{OLED}$ of the light-emitting device from the difference between the first and second currents and current-voltage characteristics of the selected pixel.

In a preferred implementation, a system is provided for controlling an array of pixels in a display in which each pixel includes a light-emitting device. Each pixel includes a pixel circuit that comprises the light-emitting device, which emits light when supplied with a voltage $V_{OLED}$; a drive transistor for driving current through the light-emitting device according to a driving voltage across the drive transistor during an emission cycle, the drive transistor having a gate, a source and a drain and characterized by a threshold voltage; and a storage capacitor coupled across the source and gate of the drive transistor for providing the driving voltage to the drive transistor. A supply voltage source is coupled to the drive transistor for supplying current to the light-emitting device via the drive transistor, the current being controlled by the driving voltage. A monitor line is coupled to a read transistor that controls the coupling of the monitor line to a first node that is common to the source side of the storage capacitor, the source of the drive transistor, and the light-emitting device. A data line is coupled to a switching transistor that controls the coupling of the data line to a second node that is common to the gate side of the storage capacitor and the gate of the drive transistor. A controller coupled to the data and monitor lines and to the switching and read transistors is adapted to:

(1) during a first cycle, turn on the switching and read transistors while delivering a voltage Vb to the monitor line and a voltage Vd1 to the data line, to supply the first node with a voltage that is independent of the voltage across the light-emitting device, (2) during a second cycle, turn on the read transistor and turn off the switching transistor while delivering a voltage Vref to the monitor line, and read a first sample of the drive current at the first node via the read transistor and the monitor line, (3) during a third cycle, turn off the read transistor and turn on the switching transistor while delivering a voltage Vd2 to the data line, so that the voltage at the second node is a function of $V_{OLED}$, and (4) during a fourth cycle, turn on said read transistor and turn off said switching transistor while delivering a voltage Vref to said monitor line, and read a second sample the drive current at said first node via said read transistor and said monitor line. The first and second samples of the drive current are compared and, if they are different, the first through fourth cycles are repeated using an adjusted value of at least one of the voltages Vd1 and Vd2, until the first and second samples are substantially the same.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
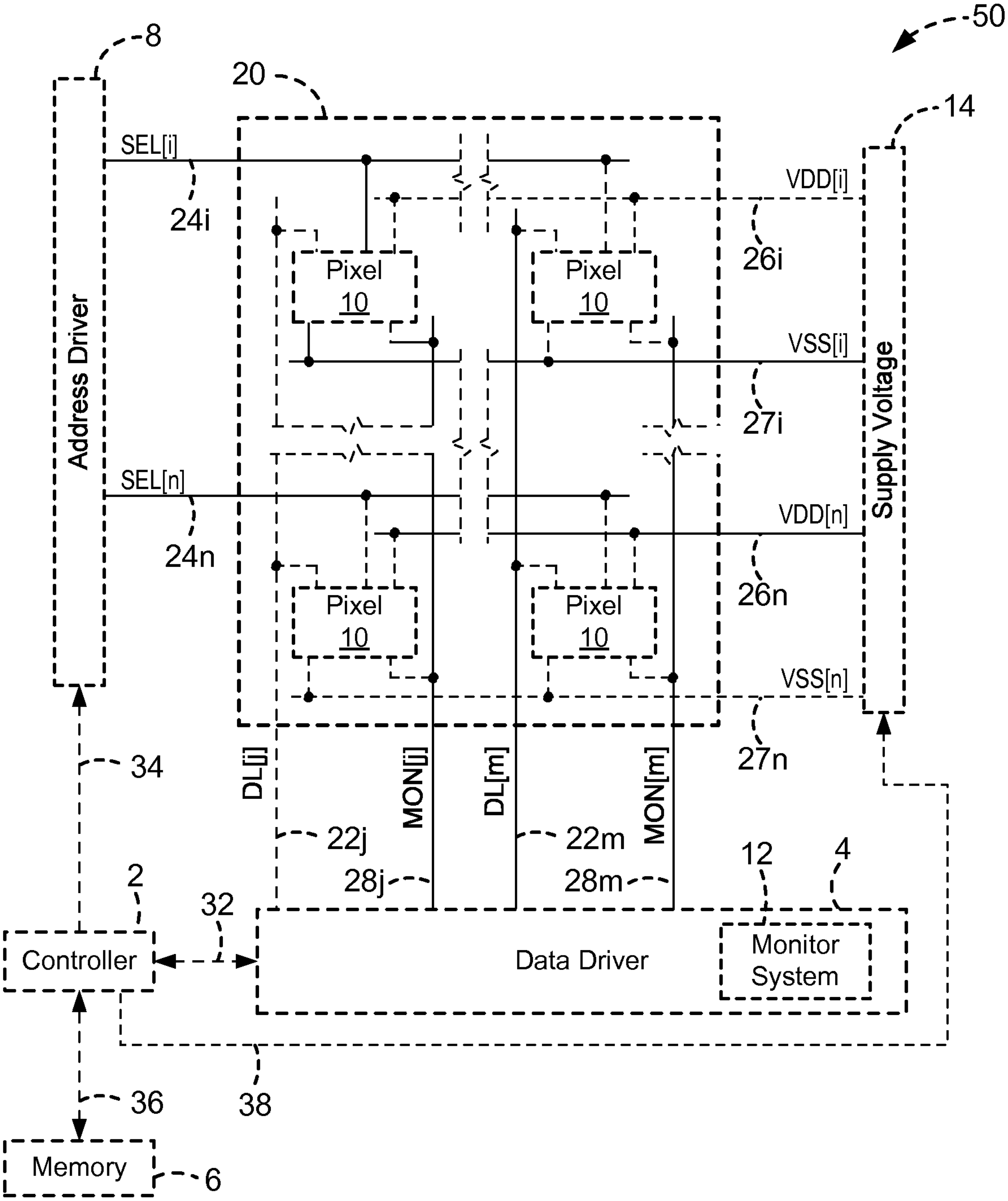
FIG. 1 is a block diagram of an exemplary configuration of a system for driving an OLED display while monitoring the degradation of the individual pixels and providing compensation therefor.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a diagram of an exemplary display system 50. The display system 50 includes an address driver 8, a data driver 4, a controller 2, a memory 6, a supply voltage 14, and a display panel 20. The display panel 20 includes an array of pixels 10 arranged in rows and columns. Each of the pixels 10 is individually programmable to emit light with individually programmable luminance values. The controller 2 receives digital data indicative of information to be displayed on the display panel 20. The controller 2 sends signals 32 to the data driver 4 and scheduling signals 34 to the address driver 8 to drive the pixels 10 in the display panel 20 to display the information indicated. The plurality of pixels 10 associated with the display panel 20 thus comprise a display array ("display screen") adapted to dynamically display information according to the input digital data received by the controller 2. The display screen can display, for example, video information from a stream of video data received by the controller 2. The supply voltage 14 can provide a constant power voltage or can be an adjustable voltage supply that is controlled by signals from the controller 2. The display system 50 can also incorporate features from a current source or sink (not shown) to provide biasing currents to the pixels 10 in the display panel 20 to thereby decrease programming time for the pixels 10.

For illustrative purposes, the display system 50 in FIG. 1 is illustrated with only four pixels 10 in the display panel 20. It is understood that the display system 50 can be implemented with a display screen that includes an array of similar pixels, such as the pixels 10, and that the display screen is not limited to a particular number of rows and columns of pixels. For example, the display system 50 can be implemented with a display screen with a number of rows and columns of pixels commonly available in displays for mobile devices, monitor-based devices, and/or projection-devices.

Each pixel 10 includes a driving circuit ("pixel circuit") that generally includes a driving transistor and a light emitting device. Hereinafter the pixel 10 may refer to the pixel circuit. The light emitting device can optionally be an organic light emitting diode (OLED), but implementations of the present disclosure apply to pixel circuits having other electroluminescence devices, including current-driven light emitting devices. The driving transistor in the pixel 10 can optionally be an n-type or p-type amorphous silicon thin-film transistor, but implementations of the present disclosure are not limited to pixel circuits having a particular polarity of transistor or only to pixel circuits having thin-film transistors. The pixel circuit can also include a storage capacitor for storing programming information and allowing the pixel circuit to drive the light emitting device after being addressed. Thus, the display panel 20 can be an active matrix display array.

As illustrated in FIG. 1, the pixel 10 illustrated as the top-left pixel in the display panel 20 is coupled to a select line 24*i*, a supply line 26*i*, a data line 22*j*, and a monitor line 28*j*. A read line may also be included for controlling connections to the monitor line. In one implementation, the supply voltage 14 can also provide a second supply line to the pixel 10. For example, each pixel can be coupled to a first supply line 26 charged with Vdd and a second supply line 27 coupled with Vss, and the pixel circuits 10 can be situated between the first and second supply lines to facilitate driving current between the two supply lines during an emission phase of the pixel circuit. The top-left pixel 10 in the display panel 20 can correspond to a pixel in the display panel in a "ith" row and "jth" column of the display panel 20. Similarly, the top-right pixel 10 in the display panel 20 represents a "jth" row and "mth" column; the bottom-left pixel 10 represents an "nth" row and "jth" column; and the bottom-right pixel 10 represents an "nth" row and "mth" column. Each of the pixels 10 is coupled to appropriate select lines (e.g., the select lines 24*i* and 24*n*), supply lines (e.g., the supply lines 26*i* and 26*n*), data lines (e.g., the data lines 22*j* and 22*m*), and monitor lines (e.g., the monitor lines 28*j* and 28*m*). It is noted that aspects of the present disclosure apply to pixels having additional connections, such as connections to additional select lines, and to pixels having fewer connections, such as pixels lacking a connection to a monitoring line.

With reference to the top-left pixel 10 shown in the display panel 20, the select line 24*i* is provided by the address driver 8, and can be utilized to enable, for example, a programming operation of the pixel 10 by activating a switch or transistor to allow the data line 22*j* to program the pixel 10. The data line 22*j* conveys programming information from the data driver 4 to the pixel 10. For example, the data line 22*j* can be utilized to apply a programming voltage or a programming current to the pixel 10 in order to program the pixel 10 to emit a desired amount of luminance. The programming voltage (or programming current) supplied by the data driver 4 via the data line 22*j* is a voltage (or current) appropriate to cause the pixel 10 to emit light with a desired amount of luminance according to the digital data received by the controller 2. The programming voltage (or programming current) can be applied to the pixel 10 during a programming operation of the pixel 10 so as to charge a storage device within the pixel 10, such as a storage capacitor, thereby enabling the pixel 10 to emit light with the desired amount of luminance during an emission operation following the programming operation. For example, the storage device in the pixel 10 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 10, the driving current that is conveyed through the light emitting device by the driving transistor during the emission operation of the pixel 10 is a current that is supplied by the first supply line 26*i* and is drained to a second supply line 27*i*. The first supply line 26*i* and the second supply line 27*i* are coupled to the supply voltage 14. The first supply line 26*i* can provide a positive supply voltage (e.g., the voltage commonly referred to in circuit design as "Vdd") and the second supply line 27*i* can provide a negative supply voltage (e.g., the voltage commonly referred to in circuit design as "Vss"). Implementations of the present disclosure can be realized where one or the other of the supply lines (e.g., the supply line 27*i*) is fixed at a ground voltage or at another reference voltage.

The display system 50 also includes a monitoring system 12. With reference again to the top left pixel 10 in the display panel 20, the monitor line 28*j* connects the pixel 10 to the monitoring system 12. The monitoring system 12 can be integrated with the data driver 4, or can be a separate stand-alone system. In particular, the monitoring system 12 can optionally be implemented by monitoring the current and/or voltage of the data line 22*j* during a monitoring operation of the pixel 10, and the monitor line 28*j* can be entirely omitted. Additionally, the display system 50 can be implemented without the monitoring system 12 or the monitor line 28*j*. The monitor line 28*j* allows the monitoring system 12 to measure a current or voltage associated with the pixel 10 and thereby extract information indicative of a degradation of the pixel 10. For example, the monitoring system 12 can extract, via the monitor line 28*j*, a current flowing through the driving transistor within the pixel 10 and thereby determine, based on the measured current and based on the voltages applied to the driving transistor during the measurement, a threshold voltage of the driving transistor or a shift thereof.

The monitoring system 12 can also extract an operating voltage of the light emitting device (e.g., a voltage drop across the light emitting device while the light emitting device is operating to emit light). The monitoring system 12 can then communicate signals 32 to the controller 2 and/or the memory 6 to allow the display system 50 to store the extracted degradation information in the memory 6. During subsequent programming and/or emission operations of the pixel 10, the degradation information is retrieved from the memory 6 by the controller 2 via memory signals 36, and the controller 2 then compensates for the extracted degradation information in subsequent programming and/or emission operations of the pixel 10. For example, once the degradation information is extracted, the programming information conveyed to the pixel 10 via the data line 22*j* can be appropriately adjusted during a subsequent programming operation of the pixel 10 such that the pixel 10 emits light with a desired amount of luminance that is independent of the degradation of the pixel 10. In an example, an increase in the threshold voltage of the driving transistor within the pixel 10 can be compensated for by appropriately increasing the programming voltage applied to the pixel 10.

Figure 2A:
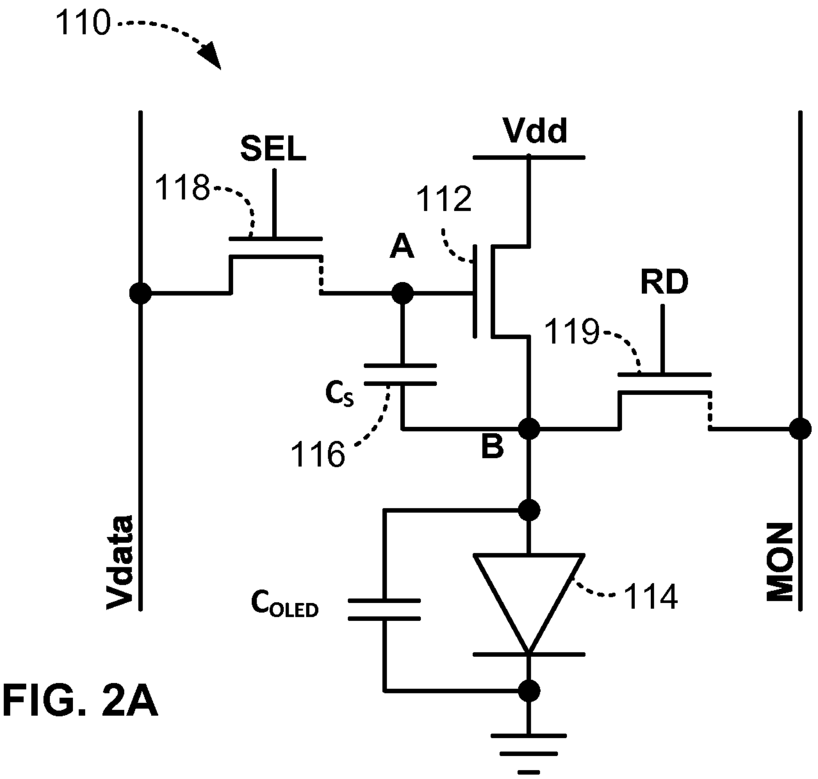
FIG. 2A is a circuit diagram of an exemplary pixel circuit configuration.

FIG. 2A is a circuit diagram of an exemplary driving circuit for a pixel 110. The driving circuit shown in FIG. 2A is utilized to calibrate, program and drive the pixel 110 and includes a drive transistor 112 for conveying a driving current through an organic light emitting diode (OLED) 114. The OLED 114 emits light according to the current passing through the OLED 114, and can be replaced by any current-driven light emitting device. The OLED 114 has an inherent capacitance $C_{OLED}$. The pixel 110 can be utilized in the display panel 20 of the display system 50 described in connection with FIG. 1.

The driving circuit for the pixel 110 also includes a storage capacitor 116 and a switching transistor 118. The pixel 110 is coupled to a select line SEL, a voltage supply line Vdd, a data line Vdata, and a monitor line MON. The driving transistor 112 draws a current from the voltage supply line Vdd according to a gate-source voltage (Vgs) across the gate and source terminals of the drive transistor 112. For example, in a saturation mode of the drive transistor 112, the current passing through the drive transistor 112 can be given by $Ids=\beta(Vgs-Vt)^2$, where β is a parameter that depends on device characteristics of the drive transistor 112, Ids is the current from the drain terminal to the source terminal of the drive transistor 112, and Vt is the threshold voltage of the drive transistor 112.

In the pixel 110, the storage capacitor 116 is coupled across the gate and source terminals of the drive transistor 112. The storage capacitor 116 has a first terminal, which is referred to for convenience as a gate-side terminal, and a second terminal, which is referred to for convenience as a source-side terminal. The gate-side terminal of the storage capacitor 116 is electrically coupled to the gate terminal of the drive transistor 112. The source-side terminal 116*s* of the storage capacitor 116 is electrically coupled to the source terminal of the drive transistor 112. Thus, the gate-source voltage Vgs of the drive transistor 112 is also the voltage charged on the storage capacitor 116. As will be explained further below, the storage capacitor 116 can thereby maintain a driving voltage across the drive transistor 112 during an emission phase of the pixel 110.

The drain terminal of the drive transistor 112 is connected to the voltage supply line Vdd, and the source terminal of the drive transistor 112 is connected to (1) the anode terminal of the OLED 114 and (2) a monitor line MON via a read transistor 119. A cathode terminal of the OLED 114 can be connected to ground or can optionally be connected to a second voltage supply line, such as the supply line Vss shown in FIG. 1. Thus, the OLED 114 is connected in series with the current path of the drive transistor 112. The OLED 114 emits light according to the magnitude of the current passing through the OLED 114, once a voltage drop across the anode and cathode terminals of the OLED achieves an operating voltage ($V_{OLED}$) of the OLED 114. That is, when the difference between the voltage on the anode terminal and the voltage on the cathode terminal is greater than the operating voltage $V_{OLED}$, the OLED 114 turns on and emits light. When the anode-to-cathode voltage is less than $V_{OLED}$, current does not pass through the OLED 114.

The switching transistor 118 is operated according to the select line SEL (e.g., when the voltage on the select line SEL is at a high level, the switching transistor 118 is turned on, and when the voltage SEL is at a low level, the switching transistor is turned off). When turned on, the switching transistor 118 electrically couples node A (the gate terminal of the driving transistor 112 and the gate-side terminal of the storage capacitor 116) to the data line Vdata.

The read transistor 119 is operated according to the read line RD (e.g., when the voltage on the read line RD is at a high level, the read transistor 119 is turned on, and when the voltage RD is at a low level, the read transistor 119 is turned off). When turned on, the read transistor 119 electrically couples node B (the source terminal of the driving transistor 112, the source-side terminal of the storage capacitor 116, and the anode of the OLED 114) to the monitor line MON.

Figure 2B:
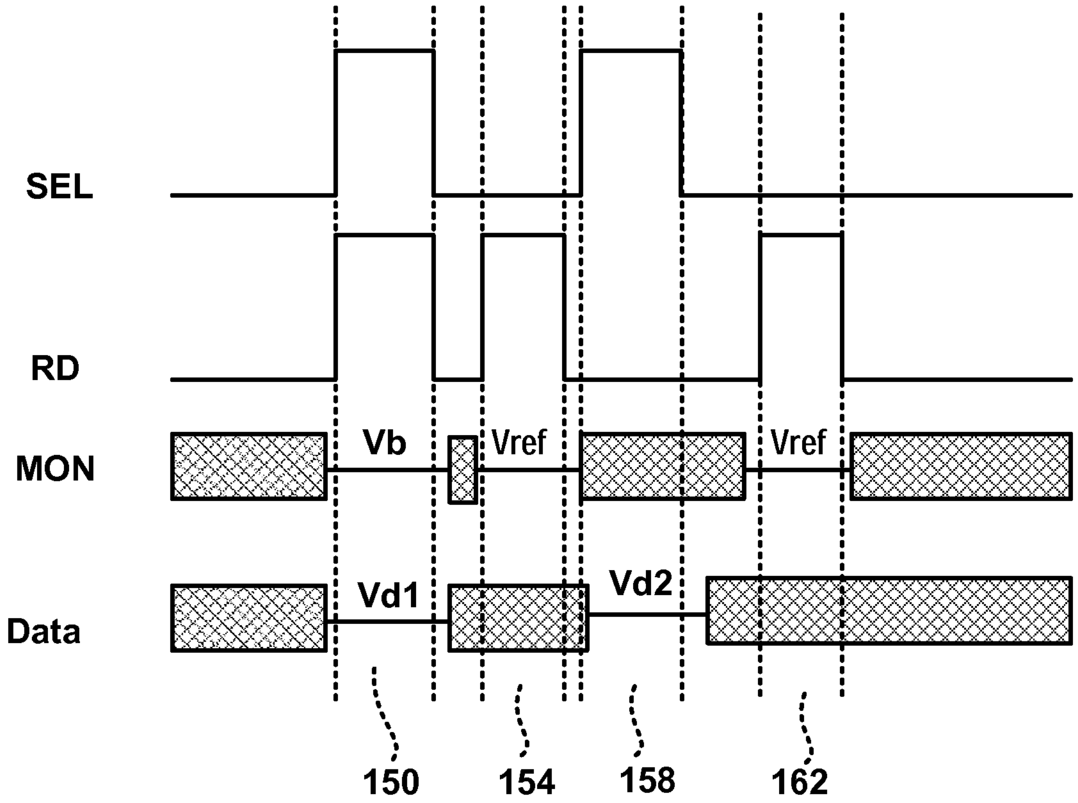
FIG. 2B is a timing diagram of first exemplary operation cycles for the pixel shown in FIG. 2A.

FIG. 2B is a timing diagram of exemplary operation cycles for the pixel 110 shown in FIG. 2A. During a first cycle 150, both the SEL line and the RD line are high, so the corresponding transistors 118 and 119 are turned on. The switching transistor 118 applies a voltage Vd1, which is at a level sufficient to turn on the drive transistor 112, from the data line Vdata to node A. The read transistor 119 applies a monitor-line voltage Vb, which is at a level that turns the OLED 114 off, from the monitor line MON to node B. As a result, the gate-source voltage Vgs is independent of $V_{OLED}$ (Vd1−Vb−Vds3, where Vds3 is the voltage drop across the read transistor 119). The SEL and RD lines go low at the end of the cycle 150, turning off the transistors 118 and 119.

During the second cycle 154, the SEL line is low to turn off the switching transistor 118, and the drive transistor 112 is turned on by the charge on the capacitor 116 at node A. The voltage on the read line RD goes high to turn on the read transistor 119 and thereby permit a first sample of the drive transistor current to be taken via the monitor line MON, while the OLED 114 is off. The voltage on the monitor line MON is Vref, which may be at the same level as the voltage Vb in the previous cycle.

During the third cycle 158, the voltage on the select line SEL is high to turn on the switching transistor 118, and the voltage on the read line RD is low to turn off the read transistor 119. Thus, the gate of the drive transistor 112 is charged to the voltage Vd2 of the data line Vdata, and the source of the drive transistor 112 is set to $V_{OLED}$ by the OLED 114. Consequently, the gate-source voltage Vgs of the drive transistor 112 is a function of $V_{OLED}$ ($Vgs=Vd2-V_{OLED}$).

During the fourth cycle 162, the voltage on the select line SEL is low to turn off the switching transistor, and the drive transistor 112 is turned on by the charge on the capacitor 116 at node A. The voltage on the read line RD is high to turn on the read transistor 119, and a second sample of the current of the drive transistor 112 is taken via the monitor line MON.

If the first and second samples of the drive current are not the same, the voltage Vd2 on the Vdata line is adjusted, the programming voltage Vd2 is changed, and the sampling and adjustment operations are repeated until the second sample of the drive current is the same as the first sample. When the two samples of the drive current are the same, the two gate-source voltages should also be the same, which means that:

$$\begin{aligned} V_{OLED} &= Vd2 - Vgs \\ &= Vd2 - (Vd1 - Vb - Vds3) \\ &= Vd2 - Vd1 + Vb + Vds3. \end{aligned}$$

After some operation time (t), the change in $V_{OLED}$ between time 0 and time t is $\Delta V_{OLED}=V_{OLED}(t)-V_{OLED}(0)=Vd\mathbf{2}(t)-Vd\mathbf{2}(\mathbf{0})$. Thus, the difference between the two programming voltages Vd2(*t*) and Vd2(0) can be used to extract the OLED voltage.

Figure 2C:
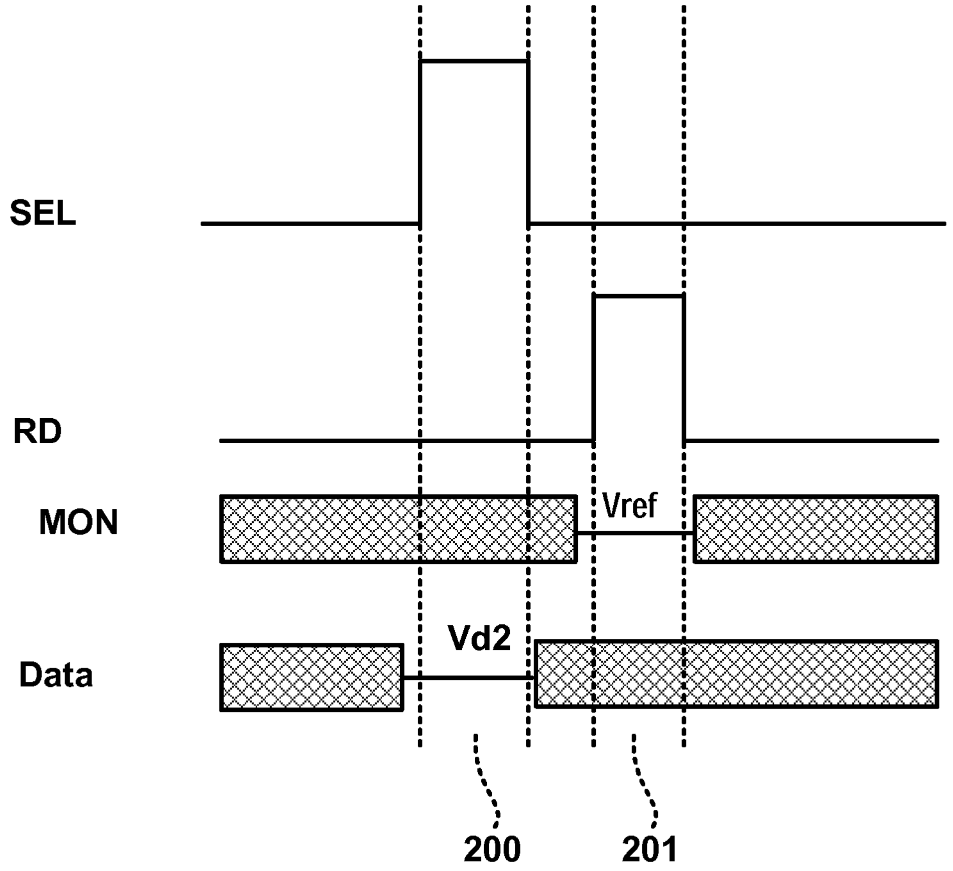
FIG. 2C is a timing diagram of second exemplary operation cycles for the pixel shown in FIG. 2A.

FIG. 2C is a modified schematic timing diagram of another set of exemplary operation cycles for the pixel 110 shown in FIG. 2A, for taking only a single reading of the drive current and comparing that value with a known reference value. For example, the reference value can be the desired value of the drive current derived by the controller to compensate for degradation of the drive transistor 112 as it ages. The OLED voltage $V_{OLED}$ can be extracted by measuring the difference between the pixel currents when the pixel is programmed with fixed voltages in both methods (being affected by $V_{OLED}$ and not being affected by $V_{OLED}$). This difference and the current-voltage characteristics of the pixel can then be used to extract $V_{OLED}$.

During the first cycle 200 of the exemplary timing diagram in FIG. 2C, the select line SEL is high to turn on the switching transistor 118, and the read line RD is low to turn off the read transistor 118. The data line Vdata supplies a voltage Vd2 to node A via the switching transistor 118. During the second cycle 201, SEL is low to turn off the switching transistor 118, and RD is high to turn on the read transistor 119. The monitor line MON supplies a voltage Vref to the node B via the read transistor 118, while a reading of the value of the drive current is taken via the read transistor 119 and the monitor line MON. This read value is compared with the known reference value of the drive current and, if the read value and the reference value of the drive current are different, the cycles 200 and 201 are repeated using an adjusted value of the voltage Vd2. This process is repeated until the read value and the reference value of the drive current are substantially the same, and then the adjusted value of Vd2 can be used to determine $V_{OLED}$.

Figure 3:
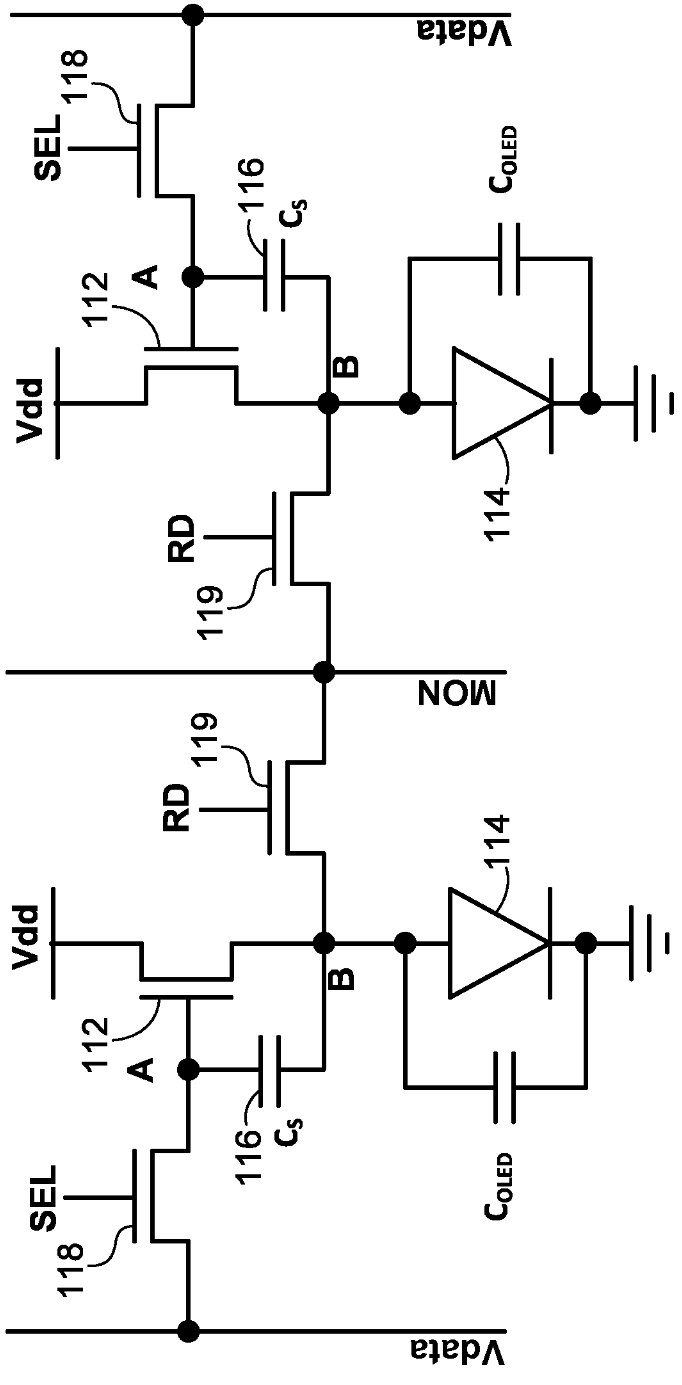
FIG. 3 is a circuit diagram of another exemplary pixel circuit configuration.

FIG. 3 is a circuit diagram of two of the pixels 110*a* and 110*b* like those shown in FIG. 2A but modified to share a common monitor line MON, while still permitting independent measurement of the driving current and OLED voltage separately for each pixel. The two pixels 110*a* and 110*b* are in the same row but in different columns, and the two columns share the same monitor line MON. Only the pixel selected for measurement is programmed with valid voltages, while the other pixel is programmed to turn off the drive transistor 12 during the measurement cycle. Thus, the drive transistor of one pixel will have no effect on the current measurement in the other pixel.

Figure 4:
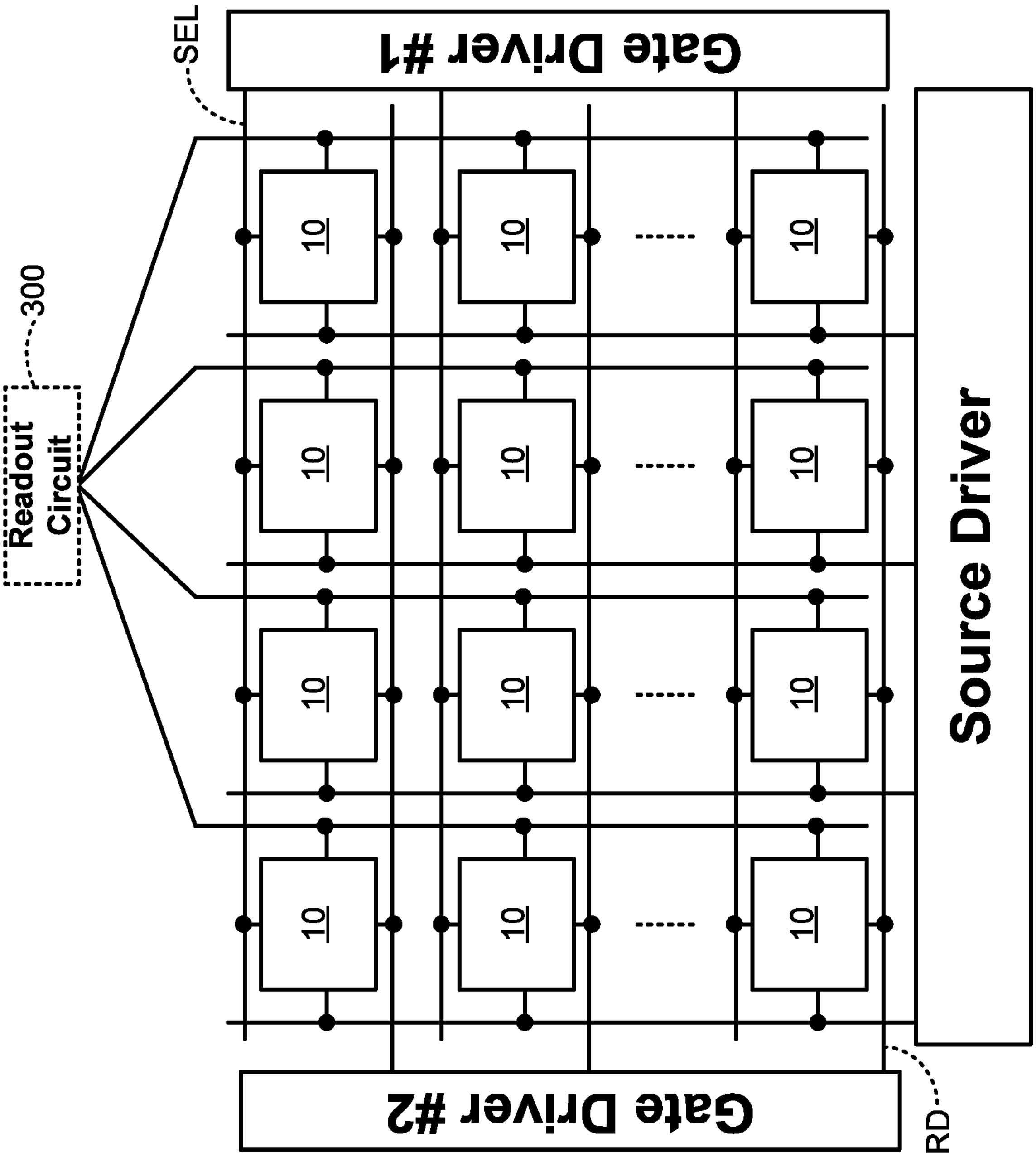
FIG. 4 is a block diagram of a modified configuration of a system for driving an OLED display using a shared readout circuit, while monitoring the degradation of the individual pixels and providing compensation therefor.

FIG. 4 illustrates a drive system that utilizes a readout circuit (ROC) 300 that is shared by multiple columns of pixels while still permitting the measurement of the driving current and OLED voltage independently for each of the individual pixels 10. Although only four columns are illustrated in FIG. 4, it will be understood that a typical display contains a much larger number of columns. Multiple readout circuits can be utilized, with each readout circuit sharing multiple columns, so that the number of readout circuits is significantly less than the number of columns. Only the pixel selected for measurement at any given time is programmed with valid voltages, while all the other pixels sharing the same gate signals are programmed with voltages that cause the respective drive transistors to be off. Consequently, the drive transistors of the other pixels will have no effect on the current measurement being taken of the selected pixel. Also, when the driving current in the selected pixel is used to measure the OLED voltage, the measurement of the OLED voltage is also independent of the drive transistors of the other pixels.

Figure 5:
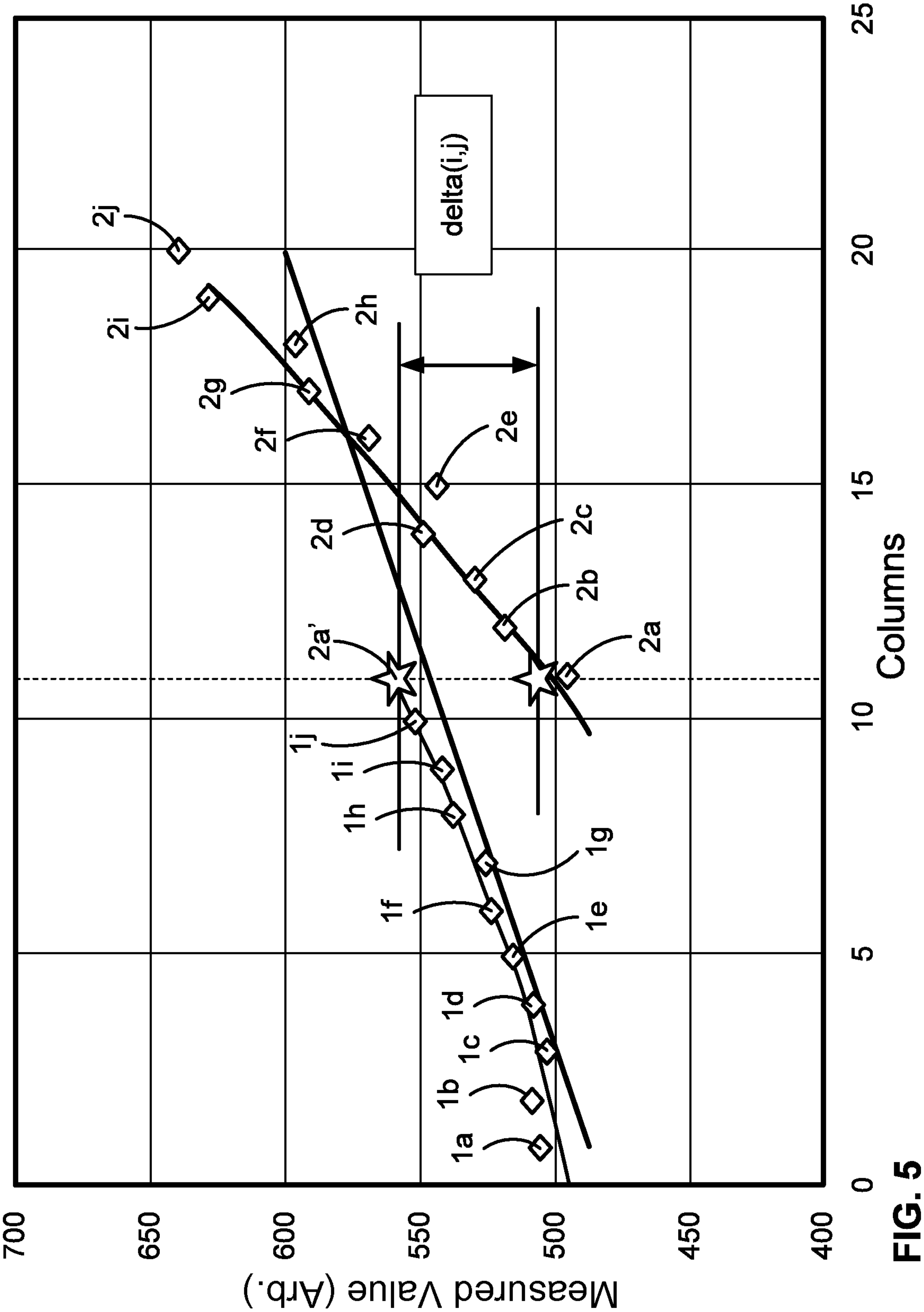
FIG. 5 is an example of measurements taken by two different readout circuits from adjacent groups of pixels in the same row.

When multiple readout circuits are used, multiple levels of calibration can be used to make the readout circuits identical. However, there are often remaining non-uniformities among the readout circuits that measure multiple columns, and these non-uniformities can cause steps in the measured data across any given row. One example of such a step is illustrated in FIG. 5 where the measurements 1*a*-1*j* for columns 1-10 are taken by a first readout circuit, and the measurements 2*a*-2*j* for columns 11-20 are taken by a second readout circuit. It can be seen that there is a significant step between the measurements 1*j* and 2*a* for the adjacent columns 10 and 11, which are taken by different readout circuits. To adjust this non-uniformity between the last of a first group of measurements made in a selected row by the first readout circuit, and the first of an adjacent second group of measurements made in the same row by the second readout circuit, an edge adjustment can be made by processing the measurements in a controller coupled to the readout circuits and programmed to:

(1) determine a curve fit for the values of the parameter(s) measured by the first readout circuit (e.g., values 1*a*-1*j* in FIG. 5), (2) determine a first value 2*a*' of the parameter(s) of the first pixel in the second group from the curve fit for the values measured by the first readout circuit, (3) determine a second value 2*a* of the parameter(s) measured for the first pixel in the second group from the values measured by the second readout circuit, (4) determine the difference (2*a*'-2*a*), or "delta value," between the first and second values for the first pixel in the second group, and (5) adjust the values of the remaining parameter(s) 2*b*-2*j* measured for the second group of pixels by the second readout circuit, based on the difference between the first and second values for the first pixel in the second group.

This process is repeated for each pair of adjacent pixel groups measured by different readout circuits in the same row.

The above adjustment technique can be executed on each row independently, or an average row may be created based on a selected number of rows. Then the delta values are calculated based on the average row, and all the rows are adjusted based on the delta values for the average row.

Another technique is to design the panel in a way that the boundary columns between two readout circuits can be measured with both readout circuits. Then the pixel values in each readout circuit can be adjusted based on the difference between the values measured for the boundary columns, by the two readout circuits.

If the variations are not too great, a general curve fitting (or low pass filter) can be used to smooth the rows and then the pixels can be adjusted based on the difference between real rows and the created curve. This process can be executed for all rows based on an average row, or for each row independently as described above.

The readout circuits can be corrected externally by using a single reference source (or calibrated sources) to adjust each ROC before the measurement. The reference source can be an outside current source or one or more pixels calibrated externally. Another option is to measure a few sample pixels coupled to each readout circuit with a single measurement readout circuit, and then adjust all the readout circuits based on the difference between the original measurement and the measured values made by the single measurement readout circuit.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for determining a pixel parameter of a pixel in an array of pixels in a display, the system comprising:
- a controller adapted to:
  - determine a final first input electrical signal provided to the pixel which results in a first output electrical signal from the pixel equal to a predetermined electrical signal; and
  - extract the pixel parameter with use of the final first input electrical signal, wherein one of the first output electrical signal and the predetermined electrical signal is a function of the pixel parameter.

2. The system of claim 1, wherein the controller is adapted to determine the final first input signal by being adapted to:
- measure the first output electrical signal from the pixel in response to providing the first input electrical signal to the pixel, while varying the first input electrical signal until reaching the final first input electrical signal provided to the pixel when the first output electrical signal equals the predetermined electrical signal.

3. The system of claim 1 wherein the predetermined electrical signal is a predetermined known reference current and the first output electrical signal is a first output current which is a function of the pixel parameter.

4. The system of claim 1 wherein the predetermined electrical signal is a previously measured second output electrical signal, the second output electrical signal previously output from the pixel in response to a second input electrical signal provided to the pixel.

5. The system of claim 4 wherein the controller is adapted to extract the pixel parameter with use of the second input electrical signal provided to the pixel.

6. The system of claim 5 wherein the controller is adapted to extract the pixel parameter from a difference between the final first input electrical signal provided to the pixel and the second input electrical signal.

7. The system of claim 4 wherein the controller is further adapted to, prior to the determining of the final first input electrical signal, setting the second input electrical signal provided to the pixel to generate the measured second output electrical signal, wherein only one of the first output electrical signal and the predetermined electrical signal is a function of the pixel parameter.

8. The system of claim 1 wherein the first output electrical signal is a function of the pixel parameter, and wherein the controller is further adapted to:
- at an earlier time previous to the extracting of the pixel parameter, determine a final third input electrical signal provided to the pixel which results in a third output electrical signal equal to the predetermined electrical signal, wherein one of the predetermined electrical signal and the third output electrical signal is a function of the pixel parameter at the earlier time, and extract the pixel parameter at the earlier time with use of the final third input electrical signal; and
- extract the pixel parameter with use of the final third input electrical signal provided to the pixel and the final first input electrical signal provided to the pixel and the pixel parameter at the earlier time.

9. The system of claim 8 wherein only one of the predetermined electrical signal and the third output electrical signal is a function of the pixel parameter at the earlier time.

10. The system of claim 1, wherein the pixel comprises a light-emitting device and the pixel parameter is the operational voltage $V_{oLED}$ of the light-emitting device.

11. A method of determining a pixel parameter of a pixel in an array of pixels in a display, the method comprising:
- determining a final first input electrical signal provided to the pixel which results in a first output electrical signal from the pixel equal to a predetermined electrical signal; and
- extracting the pixel parameter with use of the final first input electrical signal provided to the pixel, wherein one of the first output electrical signal and the predetermined electrical signal is a function of the pixel parameter.

12. The method of claim 11 wherein determining the final first input electrical signal further comprises:
- while measuring the first output electrical signal from the pixel in response to providing the first input electrical signal to the pixel, varying the first input electrical signal until reaching the final first input electrical signal provided to the pixel when the first output electrical signal equals the predetermined electrical signal.

13. The method of claim 11 wherein the predetermined electrical signal is a predetermined known reference current and the first output electrical signal is a first output current which is a function of the pixel parameter.

14. The method of claim 11 wherein the predetermined electrical signal is a previously measured second output electrical signal, the second output electrical signal previously output from the pixel in response to a second input electrical signal provided to the pixel.

15. The method of claim 14 wherein the extracting comprises extracting the pixel parameter with use of the second input electrical signal provided to the pixel.

16. The method of claim 15 wherein the extracting comprises extracting the pixel parameter from a difference between the final first input electrical signal provided to the pixel and the second input electrical signal provided to the pixel.

17. The method of claim 14 further comprising:
- prior to the determining the final first input electrical signal, setting the second input electrical signal provided to the pixel to generate the measured second output electrical signal, wherein only one of the first output electrical signal and the predetermined electrical signal is a function of the pixel parameter.

18. The method of claim 11 wherein the first output electrical signal is a function of the pixel parameter, the method further comprising:
- at an earlier time previous to the extracting of the pixel parameter, determining a final third input electrical signal provided to the pixel which results in a third output electrical signal from the pixel equal to the predetermined electrical signal, wherein one of the predetermined electrical signal and the third output electrical signal is a function of the pixel parameter at the earlier time, and extracting the pixel parameter at the earlier time with use of the final third input electrical signal provided to the pixel; and extracting the pixel parameter with use of the final third input electrical signal provided to the pixel and the final first input electrical signal provided to the pixel and the pixel parameter at the earlier time.

19. The method of claim 18 wherein only one of the predetermined electrical signal and the third output electrical signal is a function of the pixel parameter at the earlier time.

20. The method of claim 11, wherein the pixel comprises a light-emitting device and the pixel parameter is the operational voltage $V_{oLED}$ of the light-emitting device.

* * * * *